United States Patent [19]

Meisinger et al.

[11] Patent Number: 5,343,798
[45] Date of Patent: Sep. 6, 1994

[54] APPARATUS FOR GRIPPING AND SEALING A FLUID CONDUIT

[75] Inventors: Stanlee W. Meisinger, Golden Valley; Mark D. Medved, Stillwater, both of Minn.

[73] Assignee: FasTest Inc., St. Paul, Minn.

[21] Appl. No.: 945,813

[22] Filed: Sep. 15, 1992

[51] Int. Cl.$^5$ .............. F01B 31/00; F16J 15/16; B65D 53/00; F16L 33/16
[52] U.S. Cl. ................... 92/130 A; 277/27; 277/73; 277/103; 277/117; 285/96
[58] Field of Search ........... 285/96, 101, 105, 109, 285/113; 277/27, 73, 103, 116.4, 116.6, 116.8, 117, 171, 116.2, 115, 118, 120; 92/108, 110, 130 A, 139, 140; 91/471

[56] References Cited

U.S. PATENT DOCUMENTS

| | | |
|---|---|---|
| 1,466,450 | 8/1923 | Kothe . |
| 2,475,748 | 7/1949 | Leroy . |
| 2,694,453 | 11/1954 | Longeval et al. .............. 277/73 |
| 2,953,919 | 9/1960 | Potts . |
| 2,998,721 | 9/1961 | Gawlik . |
| 3,062,295 | 11/1962 | Hanes ...................... 277/116.2 |
| 3,097,866 | 7/1963 | Iversen ........................ 285/96 X |
| 3,147,992 | 9/1964 | Haeber et al. ................ 285/101 X |
| 3,193,917 | 7/1965 | Loomis . |
| 3,436,084 | 4/1969 | Courter ...................... 277/116.2 |
| 3,499,469 | 3/1970 | Vizuete et al. ................. 138/90 |
| 4,385,643 | 4/1983 | Noe . |
| 4,393,674 | 7/1983 | Rasmussen . |
| 4,602,500 | 7/1986 | Kelly ........................... 73/49.8 |
| 4,611,485 | 9/1986 | Leslie . |
| 4,813,342 | 3/1989 | Schneider et al. ............. 277/117 X |
| 5,226,492 | 7/1993 | Solaeche et al. .............. 277/118 X |

*Primary Examiner*—Edward K. Look
*Assistant Examiner*—John Ryznic
*Attorney, Agent, or Firm*—Merchant, Gould, Smith, Edell, Welter & Schmidt

[57] ABSTRACT

A connection apparatus for connection with an inside of a fluid conduit including seal member, sleeve member and collet assembly to seal and grip the fluid conduit which is in fluid communication with a fluid passageway. The connection apparatus further includes a resilient member and a control valve to cause actuating and deactuating relative movement between the collet assembly and the sleeve member so as to grip and seal the inside of the fluid conduit.

35 Claims, 5 Drawing Sheets

APPARATUS FOR GRIPPING AND SEALING A FLUID CONDUIT

FIELD OF THE INVENTION

The present invention relates to a connection apparatus for gripping and sealing a fluid conduit. More particularly, the present invention relates to a connection apparatus having means for engageably sealing and gripping the fluid conduit which is in fluid communication with a fluid passageway.

BACKGROUND OF THE INVENTION

Apparatus for gripping and sealing a fluid conduit are commonly used in various of equipment constructions and maintenances for testing leakage of fluid passages in the equipment or for testing all kind of fluid characteristics, such as temperature, pressure, flow speed, etc.

For testing leakage of the fluid passageways in equipment, a testing apparatus is placed in fluid communication with the fluid passageways in the equipment. The testing apparatus must tightly seal and grip a fluid conduit to which it is attached so that the fluid conduit does not loose from the testing apparatus and/or no fluid leakage occurs during the testing procedure.

Another important aspect is to quickly seal and grip the fluid conduit during the testing operation. A quick sealing and gripping prevents the fluid from leaking out of the fluid passageway and saves maintenance and testing time.

Another concern is that the gripping and sealing procedures are readily controllable whether manually and/or automatically. Moreover, after the testing procedure, the connection apparatus must be easily releasable.

In addition, another concern is whether the connection apparatus is universal to various sizes and kinds of fluid conduits. As the size of the fluid conduit varies in every equipment, it is necessary that the connection apparatus is readily and economically adaptable to various of fluid conduits.

Further, another concern is to reduce levers and twisting action of the gripping and sealing operation of the connection apparatus. Repetitive motions, such as physical strain and stress, etc., cause wear and damage of the tube and connection apparatus.

Various connection apparatus have been used. U.S. Pat. No. 1,466,450 issued to Kothe discloses a flue blowing and testing device.

U.S. Pat. No. 2,475,748 issued to Leroy discloses a roller tube test plug.

U.S. Pat. No. 2,853,919 issued to Potts discloses a pipe testing apparatus.

U.S. Pat. No. 2,998,721 issued to Gawlik discloses a tool for detecting pipe leaks.

U.S. Pat. No. 3,193,917 issued to Loomis discloses a method for making and testing a pipeline.

U.S. Pat. No. 3,499,469 issued to Vizuete et al. discloses a self-sealing pressure plug.

U.S. Pat. No. 4,385,643 issued to Noe discloses a plug for high-pressure testing of tubes.

U.S. Pat. No. 4,393,674 issued to Rasmussen discloses a hydraulic chuck device for engagement with the inside of a tube.

U.S. Pat. No. 4,602,500 issued to Kelly discloses an apparatus for leakage testing of tubes and joints.

However, none of the above references disclose a quick controllably gripping and sealing connection apparatus for testing fluid in various sizes of tubes as disclosed in the present invention. The present invention overcomes many of the disadvantages associated with such apparatus of this general type.

SUMMARY OF THE INVENTION

The present invention relates to a connection apparatus for gripping and sealing a fluid conduit. More particularly, the present invention relates to a connection apparatus having means for engageably sealing and gripping the fluid conduit which is in fluid communication with a fluid passageway.

One embodiment of the invention includes resilient means for actuating the connector apparatus and fluid means for deactuating the connector apparatus.

In one embodiment, a housing defining a chamber receives a slidably mounted piston means. A stem means attached to the piston means projects from the housing and defines a fluid passageway. The fluid passageway is in fluid communication with a fluid conduit which is received by the other end of the piston means.

Still in one embodiment, seal and collet means are mounted on the stem means for quick sealing and gripping the inside of the fluid conduit. The seal and collet means are interchangeable and suitable for various sizes of inner diameter of the fluid conduits. The seal and collet means includes a seal member, a sleeve member and a collet assembly. The seal member seals the inside of the tube upon seal actuating. At the same time, the sleeve member frictionally slides under the collet assembly to force the collet assembly against the inside of the tube.

Further in one embodiment, pneumatic means in the housing causes actuating and deactuating relative movement between the stem means and the housing. The actuating relative movement causes the sleeve member to slide under the collet assembly as mentioned above paragraph. The pneumatic means comprises resilient means for applying a biasing force to the piston generally along an axis of the chamber, and control means for controlling flow of pressurized fluid into and out of the chamber. The resilient means expands when the pressurized air is released from the chamber through the control means thereby causing the actuating movement. The resilient means is compressed when the pressurized air is forced into the chamber through the control means thereby causing the deactuating movement.

Still in one embodiment, retention means is disposed on the stem means for limiting reciprocal movement of the sleeve member and seal member on the stem means.

Further in one embodiment, the collet assembly is composed of at least three segments held together by at least one resilient O-ring to form a expandable ring-shape configuration so that the ring-shape collet assembly is expanded against the inside of the tube when the sleeve member is inserted under the collet assembly.

Moreover, in one embodiment, the collet assembly cooperates with the sleeve member to pivot about a location on the sleeve member into further engagement with the inside of the tube as the stem means is moved toward the housing.

Furthermore, in one embodiment, the control means having a coupling connector is button actuated for releasing and forcing pressurized air out and into the chamber of the housing.

These and various other advantages and features of novelty which characterize the invention are pointed out with particularity in the claims annexed hereto and forming a part hereof. However, for a better understanding of the invention, its advantages, and objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters generally indicate corresponding parts throughout the several views.

DETAILED DESCRIPTION OF THE PREFERRED EMBODIMENT

Figure 1:
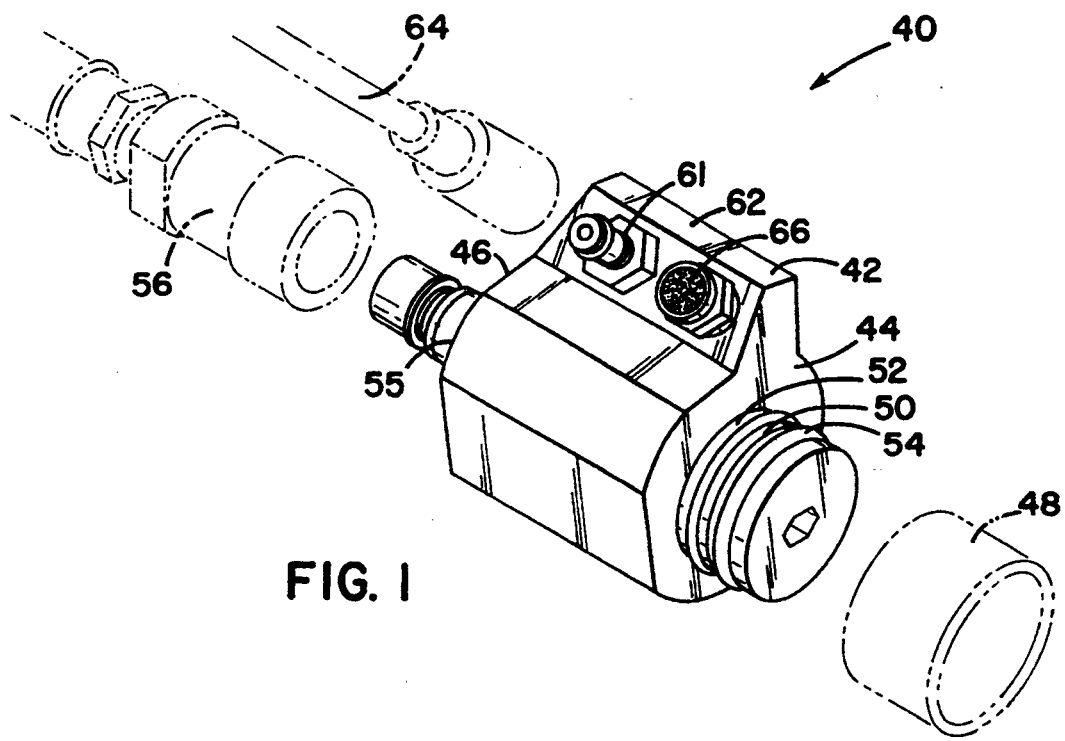
FIG. 1 is a perspective view of an embodiment of a connection apparatus in accordance with the principles of the present invention.

Referring to FIG. 1, there is shown an embodiment of a connection apparatus 40 having a housing 42. A sleeve member 50, a collet assembly 52 and a seal member 54 are disposed on a front end 44 of the housing 42 for gripping and sealing a fluid conduit 48. The inner diameter of the fluid conduit 48 can be of various sizes. One embodiment of the present invention is used with fluid conduits having an inner diameter ranging from 0.563"–1.250". It will be appreciated that various sizes of the seal member 54, collet assembly 52, and sleeve member 50 might be used so as to allow use with an even greater range of fluid conduit sizes. A receiving port 55 is disposed on a back end 46 of the housing 42 for receiving a fluid conduit 56. In the embodiment, the receiving port 55 includes a back end 58 of a piston 60. A control port 61 is disposed on a top portion 62 of the housing 42 for receiving pressurized fluid from a pressurized source 64. A vent port 66 is disposed beside the control port 61 for venting air in the housing 42.

Figures 2A, 2B:
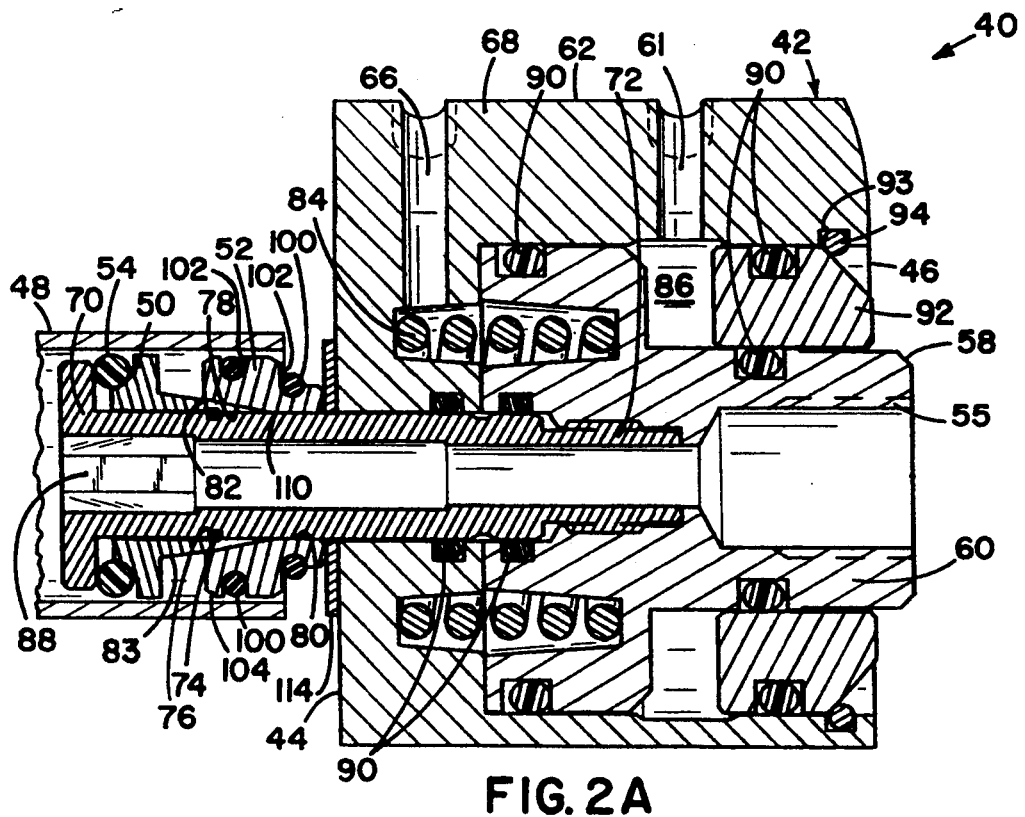
FIG. 2A is a cross-sectional view of the connection apparatus deactuated at which time a fluid conduit is released.
FIG. 2B is a cross-sectional view of the connection apparatus actuated at which time a fluid conduit is gripped and sealed.

Now referring to FIGS. 2A, 2B, the piston 60 is shown disposed in a chamber 68 defined by the housing 42. A stem member 70 is threadedly attached to the piston 68 at an end 72 and projects from the housing 42 at the front end 44 of the housing 42. The seal member 54, which is disposed between an end of the stem member 70 and the sleeve member 50, is preferably a resilient O-ring. It is preferable that the O-ring 54 is made of Urethane materials so that the resilient O-ring 54 has springy elastic characters. The O-ring 54 is supported and retained by the sleeve member 50, so as to be squeezed to seal the inside of the fluid conduit 48 by the sleeve member 50 moving toward the end of the stem member 70 (see in FIG. 2B). A snap ring 74 disposed in a snap ring groove 76 on the stem means 70 limits the reciprocal movement of the sleeve member 50 on the stem member 70, and stops movement of the sleeve member 50 toward the housing 42. This prevents the O-ring 54 from falling between the sleeve member 50 and the end of the stem member 70. The collet assembly 52 disposed between the sleeve member 50 and the front end 44 of the housing 42 has a first inner surface 78 and an extended second inner surface 80. An edge 110 is formed at their intersection. The first inner surface 78 is oblique with respect to an outer surface 83 of the sleeve member 50. The outer surface 83 engages the inner surface 78 at an engagement location 82 of the first inner surface 78 of the collet assembly 52. The location of engagement 82 changes depending on the relative location of the sleeve member 50 and the collet assembly 52.

A resilient spring member 84 disposed in the chamber 68 is connected to the piston 60. The piston 60 is moved toward the second end 46 of the housing 42 when the spring member 84 is expanded and the piston 60 is moved toward the first end 44 of the housing 42 when the spring member 84 is compressed. A control port chamber 86 disposed in the chamber 68 is connected to the control port 61 which projects out of the top portion 62 of the housing 42. The control port chamber 86 is expandable and compressible. When pressurized fluid is forced into the control port chamber 86 from an outside pressure source through the control port 61, the chamber 86 is expanded so as to compress the spring member 84 thereby moving the piston 60 and the stem member 70 to the left in FIGS. 2A,2B which moves the end of the stem member 70 away from the first end 44 of the housing 42. When pressurized fluid is released from the control port chamber 86 to the outside through the control port 61, the spring member 84 expands thereby moving the piston 60 and the stem member 70 to the right in FIGS. 2A,2B which moves the end of the stem member 70 toward the second end 46 of the housing 42.

FIG. 2A shows the connection apparatus 40 in a released or deactuated state wherein the control port chamber 86 is expanded so that the sleeve member 50 is normally attached to the collet assembly 52. FIG. 2B shows the connection apparatus 40 in a connected or actuated state wherein the control port chamber 86 is compressed so that the sleeve member 50 is forced to move under the collet assembly 52. Therefore, the collet assembly 52 is expanded outwardly so as to tightly grip an inside wall of the fluid conduit 48. FIG. 2B further shows that in the connected or actuated state the resilient O-ring 54 is compressed between the sleeve member 50 and the end of the stem member 70 so as to seal the inside wall of the fluid conduit 48.

Further in FIGS. 2A and 2B, a fluid passageway 88 defined in the stem member 70 is in fluid communication with the fluid conduit 48 on the left end. The fluid passageway 88 is in fluid communication with the fluid conduit 56 or port 56 (see FIG. 1) which is received in the receiving port 55 on the right or second end of the connection apparatus 40. Auxiliary O-rings 90 are respectively positioned between the piston 60 and the housing 42, between the piston 60 and an end cap 92, between the stem member 70 and the piston 60, and between the cap 92 and the housing 42. A retaining ring 94 disposed in a groove 93 of the top portion 62 of the housing 42 retains the cap 92 in the housing 42. The vent port 66 is disposed in the housing 42 adjacent to the chamber 68. The vent port 66 is opened to vent air in the chamber 68 when the control port chamber 86 is expanded and compressed so as to allow the spring member 84 to compress and expand accordingly.

In the preferred embodiment, the housing 42 is extruded from hard anodized aluminum. The collet assembly 52 is made of hardened stainless steel. The auxiliary resilient O-rings 90 are made of Buna-N.

Figure 3:
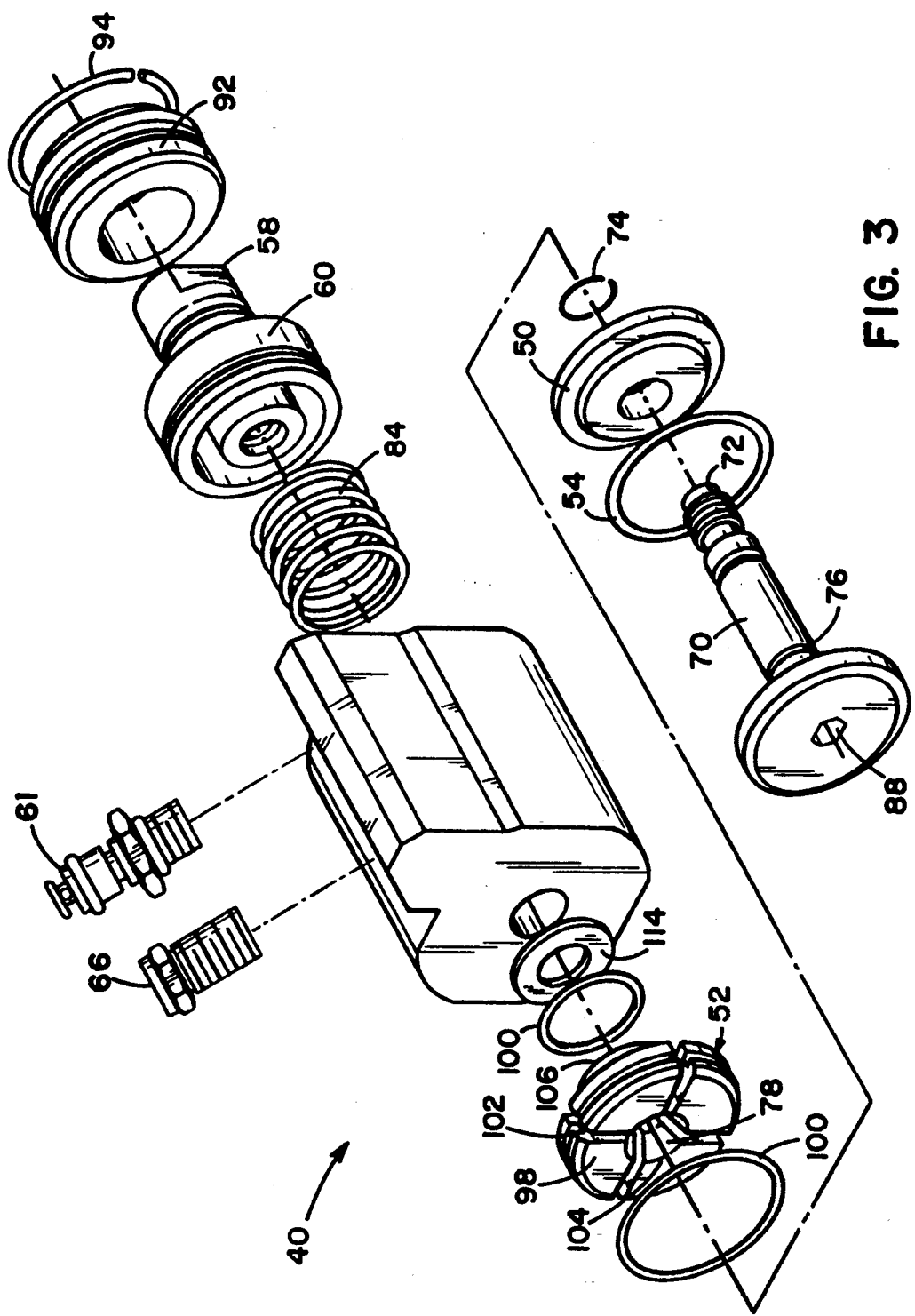
FIG. 3 is an exploded view of the connection apparatus.

Now referring to FIG. 3, there is shown an exploded view of the connection apparatus 40. The collet assembly 52 is preferably composed of four equal segments 98 which are held together by a plurality of resilient retaining rings 100 received in grooves 102 on the segments 98. The collet assembly 52 is tapered so that a front end 104 of the collet assembly 52 is larger than a back end 106 of the collet assembly 52. The first and the second inner surfaces 78, 80 of the collet assembly 52 separated by the edge 110 are close to the front and back end 104, 106 of the collet assembly 52. The first inner surface 78 has larger slope angle than that of the second inner surface 80. Therefore, when the collet assembly 52 is slid over the stem member 70 from the front end 104 to the back end 106, the segments 98 close to the back end 106 is expanded radially. A slope angle of the outer surface 83 of the sleeve member 50 is smaller than the slope angle of the first end 104 of the collet assembly 52. Thus, when the outer surface 83 of the sleeve member 50 is frictionally moved under the first inner surface 78 of the collet assembly 52, the collet assembly 52 is expanded radially so as to grip the inside of the fluid conduit 48. When the outer surface 83 of the sleeve member 50 is further moved under the first inner surface 78 of the collet assembly 52, the collet assembly 52 is further forced to engage the inside of the tube by pivotal motion of the collet assembly 52 at the engagement location 82 where the first inner surface 78 of the collet assembly 52 and the outer surface 83 of the sleeve assembly 50 engage each other. This pivotal motion causes an outer surface 130 of the collet assembly 52 to grip the inside of the fluid conduit 48.

The spacer 114 is preferably present to prevent wear on the housing 42. The stem member 70 has a hex hole at its exposed end which is provided to tighten the stem member 70 in the housing 42.

Further in FIG. 3, the spring member 84, the piston 60, the cap 92 and the retaining ring 94 are illustrated. A spacer 114 is disposed between the collet assembly 52 and the housing 42. The stem member 70 receives the seal member 54, the sleeve member 50, the snap ring 74 and the collet assembly 52 and is inserted into the chamber 68 of the housing 42 through the metal spacer 114. The stem member 70 is attached on the piston 60 by threading the threaded end of the stem member 70 into a corresponding threaded hose of the piston 60. In the embodiment shown, this is accomplished by holding the end of the piston 60 at the second end 46 of the housing 42 while the stem member 70 is rotated with a hex member.

Figure 4B:
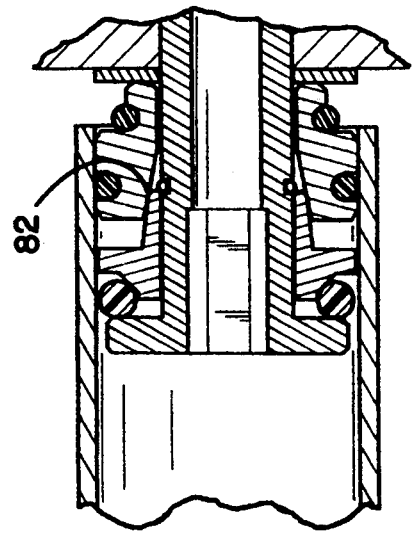
FIGS. 4A–4D are enlarged cross-section views of the seal and collet assembly in various actuating sequences.
Figure 4D:
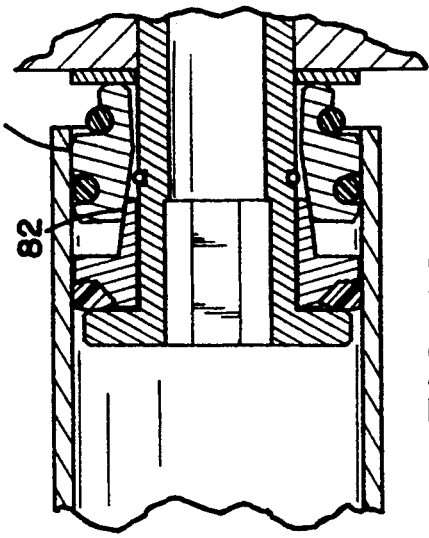
Figure 4A:
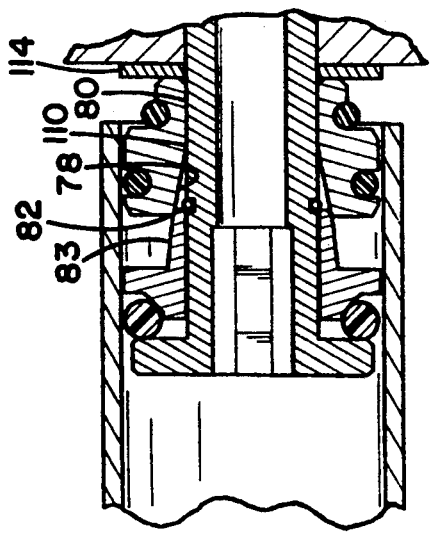
Figure 4C:
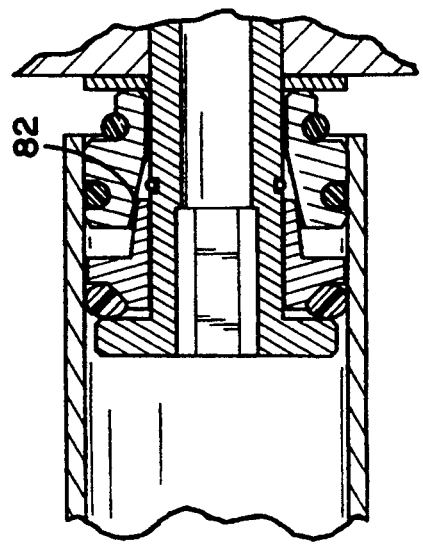

Now referring to FIGS. 4A–4D, the connection apparatus 40 is shown four sequential steps of gripping and sealing motions between the connection apparatus 40 and the fluid conduit 48 when going from the released or deactuated state to the actuated state. In FIG. 4A, the sleeve member 50 is barely engaging the collet assembly 52 and the seal member 54 is disposed between the sleeve member 50 and the end of the stem member 70 in an uncompressed state. In FIG. 4B, the stem member 70 is shown as being moved toward the housing 42 and the outer surface 83 of the sleeve member 50 is moved under the first inner surface 78 of the collet assembly 52 so as to radially expand the collet assembly 52 toward the inside wall of the fluid conduit 48. In FIG. 4C, the seal member 54 is squeezed and seal the fluid conduit 48 and the collet assembly 52 tightly grips the inside of the fluid conduit 48. In FIG. 4D, the seal member 54 is further squeezed and the collet assembly 52 is pivoted upward along the edge 82 between the outer surface 83 of the sleeve member 50 and the first inner surface 78 of the collet assembly 52 so that the outer surface 130 of the collet assembly 52 further engageably grips the inside of the fluid conduit 48. In some embodiments, this pivotal action will create a discernable sound so as to inform the operator that the connection is completed.

Figure 5C:
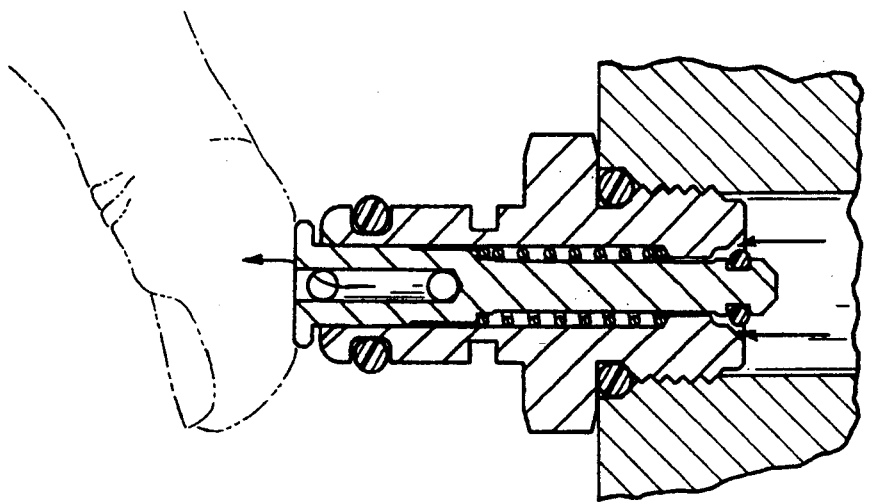
FIG. 5C is an enlarged cross-sectional view of the pneumatic control valve when pressurized air is released from the housing through the control valve by pushing a push button.
Figure 5A:
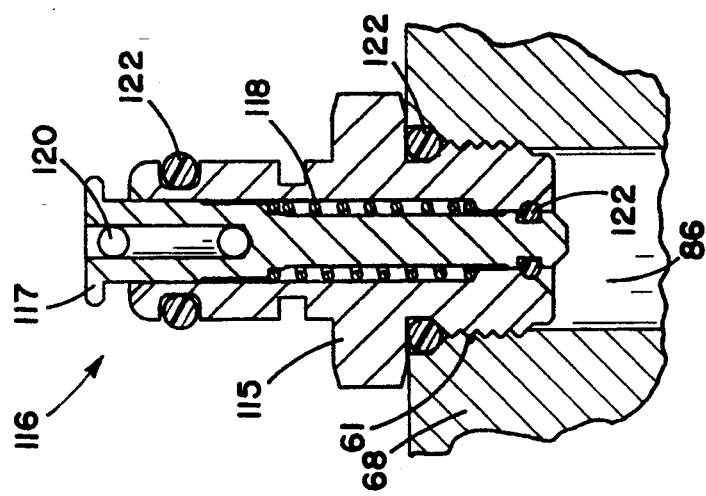
FIG. 5A is a cross-sectional view of the control valve in uncontrolled condition.
Figure 5B:
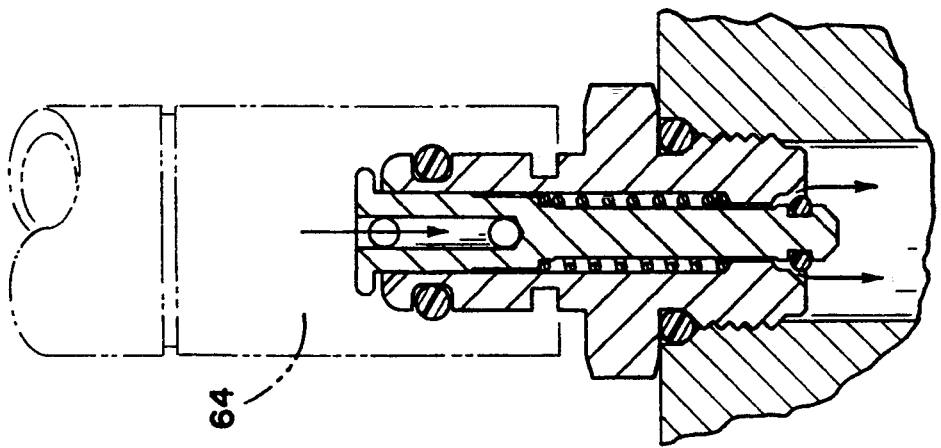
FIG. 5B is a cross-sectional view of the pneumatic control valve when pressurized air is forced into the housing through the control valve by a fluid pressure source.

Now referring to FIGS. 5A–5C, a push button control valve 116 is shown inserted into the control port 61 which disposed on the top portion 62 of the housing 42. The push button valve 116 includes a housing 115 threadedly attached in the port 61 and a push button actuator 117 respectively mounted therein. A resilient member 118 biases the actuator 117 into the closed position so there is no fluid flow. Apertures 120, which are openings for entry and exit of the pressurized fluid, are disposed in the actuator 117 and the spring 118. A fluid passageway is provided with the control port chamber 86 so as to force or release the pressurized fluid into or out of the control port chamber 86 upon movement of the actuator 117. Resilient O-rings 122 are reciprocally disposed between the housing 42 and the control valve housing 115, between the control valve housing 115 and the actuator 117. An O-ring 122 is also disposed about the actuator 117. In the preferred embodiment, the O-rings 122 are made of Buna-N.

In FIG. 5B, the pressure source (phantom line) supplies (arrows in) the pressurized fluid into the control port chamber 86 through the control port 61 and the apertures 120 of the actuator 117. In the preferred embodiment, the collet assembly segments 98 are preferably harder than the fluid conduit 48 so that the collet assembly segments 98 properly grip the fluid conduit 48.

In FIG. 5C, it is shown that to release the pressurized air, the user can push the push button actuator 117 and the pressurized fluid is released from the control port chamber 86 to the outside through the control port 61 and the apertures 120 of the actuator 117. It will be appreciated that this process might also be automated so that the fluid under pressure is inserted and/or released automatically without manual intervention.

Figure 6:
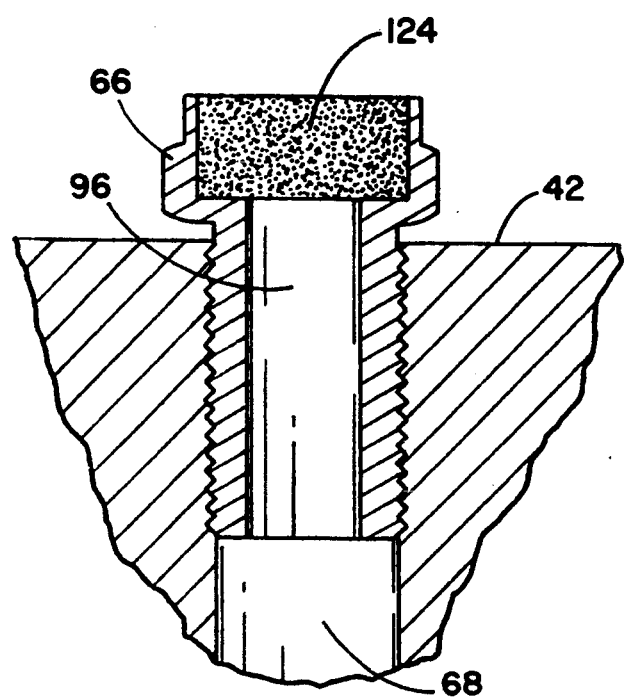
FIG. 6 is an enlarged cross-sectional view of the vent apparatus.

Now referring to FIG. 6, there is shown an enlarged view of the vent port 66. A vent filter 124 threadedly connected to a vent port conduit 96 vents the pressured air in the vent port conduit 96 with natural air outside of the housing 42. In the embodiment, sintered metal is used as the filter.

It will be appreciated that alternate embodiments in keeping with the principles of the present invention might be utilized. It is to be understood, however, that even though numerous characteristics and advantages of the invention would be set, together with details of the structure and function of the invention, the disclosure is illustrative only, and changes may be made in detail, especially in matters of shape, size and arrangement of parts, within the principle of the invention, to the full extent indicated by the broad general meaning of the terms in which the appended claims are expressed.

What is claimed is:

1. A connection apparatus for connection with an inside of a fluid conduit, comprising:
   a housing defining a chamber, the housing having first and second ends;
   piston means, having first and second ends, slidably mounted in the chamber;
   stem means, having first and second ends, attached to the piston and having a first end portion projecting from the first end of the housing, the stem means defining a fluid passageway;
   seal and collet means mounted on the first end portion of the stem means for sealing and gripping the inside of the fluid conduit so as to interconnect the fluid conduit to the fluid passageway of the stem means, the seal and collet means including a seal member, a sleeve member, and a collet assembly; and
   pneumatic means in the housing for causing actuating and deactuating relative movement between the stem means and the housing, the actuating relative movement causing an outer surface of the sleeve member to slide under an inner surface of the collet assembly, thereby forcing the collet assembly against the inside of the fluid conduit, and causing the seal member to be squeezed axially along the fluid passageway, thereby forcing the seal member to radially expand to seal the inside of the fluid conduit.

2. A connection apparatus in accordance with claim 1, wherein the pneumatic means includes resilient means disposed in the chamber for applying a biasing force to the piston generally along an axis of the chamber.

3. A connection apparatus in accordance with claim 2, wherein the pneumatic means further includes control valve means for controlling flow of pressurized fluid into and out of the chamber, the resilient means being allowed to expand when the pressurized air is released from the chamber through the control valve means, the resilient means being compressed when the pressurized air is forced into the chamber through the control valve means, the resilient means cooperating with the piston means to cause actuating and deactuating relative movement of the first end portion of the stem means and the housing.

4. A connection apparatus in accordance with claim 3, wherein the control valve means includes a coupling valve mounted in a port defined in the housing, the coupling valve being manually actuated for releasing pressurized air out of the chamber of the housing.

5. A connection apparatus in accordance with claim 2, wherein the resilient means is a resilient spring member.

6. A connection apparatus in accordance with claim 1, further including retention means disposed on the stem means for limiting reciprocal movement of the sleeve member and seal member on the stem means.

7. A connection apparatus in accordance with claim 1, wherein the seal member is disposed on the stem means intermediate of the sleeve member and the first end of the stem means.

8. A connection apparatus in accordance with claim 1, wherein the collet means is mounted on the stem means intermediate of the sleeve member and the first end of the housing.

9. A connection apparatus in accordance with claim 1, wherein the collet assembly includes a plurality of segments retained together by at least one resilient O-ring to form a ring-shape configuration.

10. A connection apparatus in accordance with claim 1, wherein the second end of the piston means includes means for connecting the piston means to a fluid conveying apparatus having a fluid passageway such that the fluid passageway of the stem means and the fluid passageway of the fluid conveying apparatus are in fluid communication.

11. A connection apparatus in accordance with claim 1, wherein the outer surface of the sleeve member and the inner surface of the collet assembly are extended obliquely relative to a longitudinal axis of the stem means.

12. A connection apparatus in accordance with claim 1, wherein the oblique surfaces of the outer surface of the sleeve member and the inner surface of the collet assembly have different angles of divergence.

13. A connection apparatus in accordance with claim 12, wherein the collet assembly has a second inner surface extending at an angle different than that of the first inner surface.

14. A connection apparatus in accordance with claim 12, wherein the collet assembly cooperates with the sleeve member to pivot about a location on the sleeve member into further engagement with the inside of the fluid conduit as the stem means is moved toward the housing.

15. A connection apparatus in accordance with claim 1, wherein the sleeve member has a second oblique surface facing the first end of the stem means receiving the seal member, the seal member being squeezed upon the actuating relative movement of the stem means toward the housing.

16. A connection apparatus in accordance with claim 1, wherein the collet assembly is pivoted toward the inside of the fluid conduit to grip the inside of the fluid conduit.

17. A connector apparatus used with the inside of a fluid conduit, comprising:
   a housing defining a chamber, the housing having first and second ends;
   piston means, having first and second ends, slidably mounted in the chamber of the housing for reciprocal movement within the chamber, the piston means defining a fluid passageway therethrough;
   a stem, having first and second ends, attached to the piston means, a first end portion of the stem projecting from the first end of the housing, the stem defining a fluid passageway therethrough in fluid communication with the fluid passageway of the piston means so as to define a fluid passageway through the housing;
   collet means mounted on the end portion of the stem projecting from the first end of the housing for engaging the inside of the fluid conduit, the collet means including a collet assembly and a sleeve mounted on the stem for reciprocal movement on the stem;

retention means disposed on the stem means for limiting reciprocal movement of the sleeve on the stem;

seal means disposed on the stem intermediate of the sleeve and the first end of the stem means for sealably engaging the inside of the fluid conduit; and pneumatic means controlling flow of pressurized fluid into and out of the chamber for causing actuating and deactuating movement of the stem relative to the housing, the pneumatic means further includes spring means disposed in the chamber of the housing for biasing the piston means along the axis of the housing, the actuating movement causing an exterior surface of the sleeve to slide under an interior surface of the collet assembly, thereby forcing the collet assembly against the inside of the fluid conduit, the actuating movement further causing the sleeve to compress the seal means into sealing engagement with the inside of the fluid conduit.

18. An apparatus in accordance with claim 17, wherein the stem is interchangeably attached to the piston means.

19. An apparatus in accordance with claim 18, wherein the collet assembly includes a plurality of equal segments held together by a plurality of O-rings.

20. An apparatus in accordance with claim 18, wherein the exterior surface of the sleeve has an angle different than that of the interior surface of the collet assembly.

21. An apparatus in accordance with claim 17, wherein the housing further includes vent means for venting fluid from an area of the housing chamber wherein the spring means is located.

22. An apparatus in accordance with claim 17, wherein the housing is of one piece extruded aluminum.

23. An apparatus in accordance with claim 17, wherein the second end of the piston means includes adaptor means for interconnection of a fluid conduit.

24. An apparatus in accordance with claim 17, wherein the stem and the piston means define tool receiving means for rotating the stem relative to the piston means.

25. A collet assembly for use on a stem of a connector apparatus to grip the inside of a fluid conduit, the connector including actuator apparatus for actuating the collet assembly, the collet assembly comprising:
   a plurality of symmetrical collet segments resiliently retained together by at least one resilient member, the collet segments defining an interior surface have a first angle;
   a sleeve having an exterior surface with a second angle, the first and second angles being different, upon actuation of the seal and collet assembly, the exterior surface of the sleeve sliding under the interior surface of the collet segments so as to force an exterior surface of the collet segments into engagement with the inside of the fluid conduit.

26. An assembly in accordance with claim 25, further including seal means for providing a fluid tight seal with the inside of the fluid conduit upon actuation.

27. An assembly in accordance with claim 25, wherein the exterior surface of collet segments engaging the inside of the fluid conduit is roughened.

28. An assembly in accordance with claim 25, wherein a plurality of O-rings retain the collet segments together, the O-rings being disposed in grooves defined in the collet segments.

29. A connection apparatus for connection with an inside of a fluid conduit, comprising:
   a housing defining a chamber, the housing having first and second ends;
   piston means, having first and second ends, slidably mounted in the chamber;
   stem means, having first and second ends, attached to the piston and having a first end portion projecting from the first end of the housing, the stem means defining a fluid passageway;
   seal and collet means mounted on the first end portion of the stem means for sealing and gripping the inside of the fluid conduit so as to interconnect the fluid conduit to the fluid passageway of the stem means, the seal and collet means including a seal member, a sleeve member, and a collet assembly; and
   pneumatic means in the housing for causing actuating and deactuating relative movement between the stem means and the housing, the actuating relative movement causing an outer surface of the sleeve member to slide under an inner surface of the collet assembly, the collet assembly being pivoted toward the inside of the fluid conduit, thereby forcing the collet assembly to grip the inside of the fluid conduit.

30. A connection apparatus in accordance with claim 29, oblique surfaces of the outer surface of the sleeve member and the inner surface of the collet assembly have different angles of divergence.

31. A connection apparatus for connection with an inside of a fluid conduit, comprising:
   a housing defining a chamber, the housing having first and second ends;
   piston means, having first and second ends, slidably mounted in the chamber;
   stem means, having first and second ends, attached to the piston and having a first end portion projecting from the first end of the housing, the stem means defining a fluid passageway;
   seal and collet means mounted on the first end portion of the stem means for sealing and gripping the inside of the fluid conduit so as to interconnect the fluid conduit to the fluid passageway of the stem means, the seal and collet means including a seal member, a sleeve member, and a collet assembly;
   pneumatic means in the housing for causing actuating and deactuating relative movement between the stem means and the housing, the actuating relative movement causing an outer surface of the sleeve member to slide under an inner surface of the collet assembly, thereby forcing the collet assembly against the inside of the fluid conduit; and
   wherein the oblique surfaces of the outer surface of the sleeve member and the inner surface of the collet assembly have different angles of divergence.

32. A connection apparatus in accordance with claim 31, wherein the collet assembly has a second inner surface extending at an angle different than that of the first inner surface.

33. A connection apparatus in accordance with claim 31, wherein the collet assembly cooperates with the sleeve member to pivot about a location on the sleeve member into further engagement with the inside of the tube as the stem means is moved toward the housing.

34. A connection apparatus for connection with an inside of a fluid conduit, comprising:

a housing defining a chamber, the housing having first and second ends;

piston means, having first and second ends, slidably mounted in the chamber;

stem means, having first and second ends, attached to the piston and having a first end portion projecting from the first end of the housing, the stem means defining a fluid passageway;

seal and collet means mounted on the first end portion of the stem means for sealing and gripping the inside of the fluid conduit so as to interconnect the fluid conduit to the fluid passageway of the stem means, the seal and collet means including a seal member, a sleeve member, and a collet assembly;

pneumatic means in the housing for causing actuating and deactuating relative movement between the stem means and the housing, the actuating relative movement causing an outer surface of the sleeve member to slide under an inner surface of the collet assembly, thereby forcing the collet assembly against the inside of the fluid conduit; and wherein the sleeve member has a second oblique surface facing the end of the stem means receiving the seal member, the seal member being squeezed upon the actuating relative movement of the stem means toward the housing.

35. A connection apparatus for connection with an inside of a fluid conduit, comprising:

a housing defining a chamber, the housing having first and second ends;

piston means, having first and second ends, slidably mounted in the chamber;

stem means, having first and second ends, attached to the piston and having a first end portion projecting from the first end of the housing, the stem means defining a fluid passageway;

seal and collet means mounted on the first end portion of the stem means for sealing and gripping the inside of the fluid conduit so as to interconnect the fluid conduit to the fluid passageway of the stem means, the seal and collet means including a seal member, a sleeve member, and a collet assembly;

pneumatic means in the housing for causing actuating and deactuating relative movement between the stem means and the housing, the actuating relative movement causing an outer surface of the sleeve member to slide under an inner surface of the collet assembly, thereby forcing the collet assembly against the inside of the fluid conduit;

wherein the pneumatic means further includes control valve means for controlling flow of pressurized fluid into and out of the chamber, resilient means being allowed to expand when the pressurized air is released from the chamber through the control valve means, the resilient means being compressed when the pressurized air is forced into the chamber through the control valve means, the resilient means cooperating with the piston means to cause actuating and deactuating relative movement of the first end portion of the stem means and the housing; and wherein the control valve means includes a coupling valve mounted in a port defined in the housing, the coupling valve being manually actuated for releasing pressurized air out of the chamber of the housing.

* * * * *